Feb. 2, 1965     W. H. DZIURA     3,168,333

QUICK DETACHABLE HOSE COUPLING

Filed Feb. 28, 1962

INVENTOR
Walter H. Dziura
BY
*H. F. Johnston*
ATTORNEY

3,168,333
QUICK DETACHABLE HOSE COUPLING
Walter H. Dziura, Naugatuck, Conn., assignor to Scovill Manufacturing Company, Waterbury, Conn., a corporation of Connecticut
Filed Feb. 28, 1962, Ser. No. 176,279
3 Claims. (Cl. 285—35)

This invention relates to quick detachable hose couplings.

Couplings having segmental threaded parts have heretofore been proposed, but they are relatively difficult to manipulate and expensive to make. Such segments have been made as separate pieces and the means for controlling and confining such pieces render the coupling objectionable for most uses.

The object of my invention, therefore, is to provide a simple hose coupling which has flexible fingers integrally connected to a collar or base which swivels on a part permanently attached to the hose, such fingers providing internally threaded segments to adapt the same for engagement with a complementary male fitting. Such fingers are thus always held in the proper relationship without the need for such things as grooves or flanges employed in other couplings to keep the segments in line.

The female portion of my improved coupling consists essentially of only two parts: (1) a piece of pliable plastic consisting of a plurality, and preferably, four internally threaded fingers or segments extending from a collar or base adapted to swivel on the usual flanged body member permanently secured to the hose; and (2) a second piece which is a manipulating sleeve having sliding and interlocking engagement around the fingers.

Other objects and advantages will hereinafter more fully appear.

Figure 1:
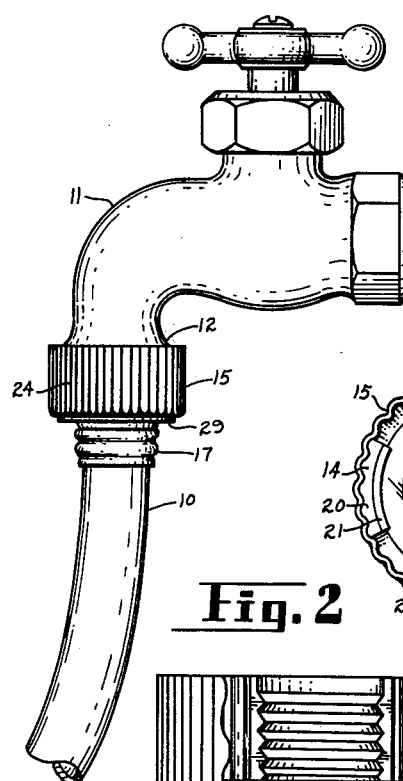
FIG. 1 is a side view of a quick detachable coupling embodying my invention and showing it attached to a faucet.

The drawing shows my quick detachable coupling connecting a hose 10 to a male fitting such as a conventional faucet 11 having the usual threaded end 12. The coupling consists essentially of a body member 13, a molded member 14 of pliable plastic material and a manipulating sleeve 15 of rigid material. The body member 13 is formed with an outwardly extending radial flange 16 at one end and at its opposite end, a neck portion 17 fitted about the hose 10. An expanded insert nipple 18 is fitted into the hose 10 to permanently secure the body member 13 to said hose. The body neck 17 and insert nipple 18 may be formed with complemental grooves and ridges for squeezing the hose material therebetween to increase the holding effect of the coupling to the hose.

The molded member 14 consists of a circular base 19 and a series of fingers 20 integral with the outer periphery of said base and extending upwardly therefrom. Preferably, four such fingers are shown in the drawing, equally spaced about the base 19, but a different number of fingers may be used to better suit a particular application of the coupling. Each of the fingers 20 is formed with internal threads 21 (interrupted) for engagement with the complemental male threads on the faucet 11.

The circular base 19 surrounds the body 13 and is adapted to bear against the inner surface of the flange 16. The base 19 is swivelly connected to the body 13 by means of a raised rib 22 formed outwardly of said body and confining said base between the rib 22 and the flange 16.

In order to confine the fingers against outward flexing, I provide the manipulating sleeve 15, made of rigid material which is here shown as a metal shell, but if desired, it may be made from one of the hard plastic materials. The sleeve 15 is formed at its inner end with an inward flange 23 that is positioned inwardly of the clutch base 19 to prevent said sleeve from being removed outwardly from the coupling.

The wall of the sleeve 15 is formed with a series of longitudinal ribs 24 of concavo-convexo shape in cross-section and which extends the full length of said sleeve. The ribs 24 thus provide a like number of flutes or channels 25 on the inner surface of the sleeve 15 that are adapted to slidably interfit with a series of complemental ribs 26 formed on the outer surface of the segmental fingers 20 and the base 19. The ribs 24 on the outer surface of the sleeve 15 will serve to enhance the gripping surface of said sleeve to facilitate the manipulation of same. The usual sealing washer 27 is carried by the coupling and held in place by being positioned between the body flange 16 and the adjacent threads 21 of the segmental fingers 20.

In order to provide a means to prevent the manipulating sleeve 15 from being lost from the coupling when removed for assembly purposes, provision is made of a retention member 28 made of relatively flexible pliable material. The retention member 28 is provided with an annulus 29 of U-shape in cross-section that is adapted to fit about the sleeve flange 23 and carried thereby. The retention member 28 also has a flexible frictional gripping flange 30 normally lying in a flat plane perpendicular to the axis of the coupling. The flange 30 is provided with a central opening 31 of less diameter than the outside diameter of the hose 10. When the sleeve 15 is in assembled position, the flexible flange 30 will be flexed to a downward conical position such as shown in FIG. 1. When the sleeve 15 is moved downwardly to separate from the coupling, the flange 30 will invert to an upward conical position as shown in dotted outline in the same figure with said flange always maintaining a frictional grip upon the hose 10, regardless of the position of said flange.

Figure 4:
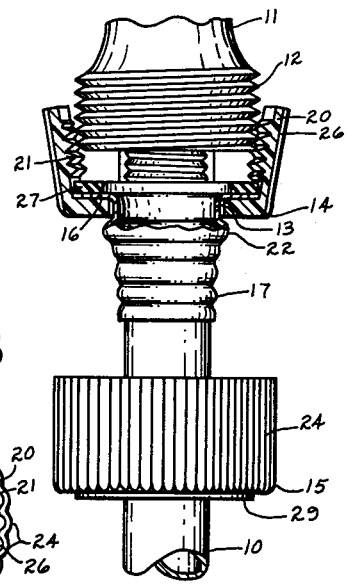
FIG. 4 is a partially sectionalized side view of the coupling as it appears partially assembled to a faucet thread; and, FIG. 5 is a perspective view of the plastic member having the flexible fingers.
Figures 2, 3:
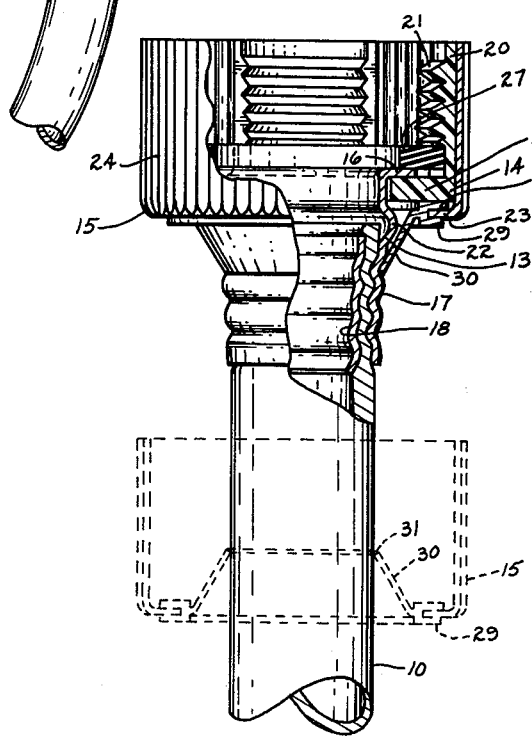
FIG. 2 is a side view of the coupling partially sectionalized and on a larger scale.
FIG. 3 is a plan view of the same.
Figure 5:
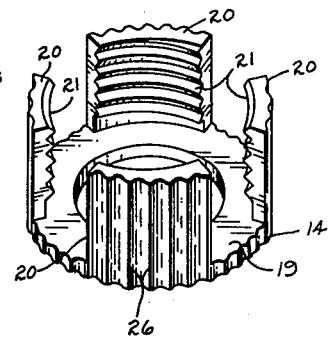

In the operation of my coupling member, it is to be understood that the sleeve 15 will be normally carried in a locked position about the segmental fingers 20. When it is desired to make a quick connection with any faucet or the like, it is first necessary to move the sleeve 15 downwardly to a position such as shown in dotted outline in FIG. 2 or the full line in FIG. 4. This will leave the fingers 20 free to flex inwardly and outwardly. The coupling will then be aligned with the threads 12 of a male fitting and then forced axially upwardly as far as can readily be done by hand. During this upward motion, the fingers 20 will flex outwardly and inwardly as the female threads 21 cam over the male threads of the connected member in a manner somewhat similar to a ratchet. With this quick movement, the threads of said fingers are interengaged with the male threads at some arbitrary position whereupon the manipulating sleeve 15 will be slipped upwardly into position with the inner flutes 25 engaging and nesting in the finger ribs 26.

In this axial assembly of the coupling and the interlocking sleeve 15, the connection between the coupling and the faucet may not be tight whereupon the operator will turn the sleeve 15 in a right-hand direction to complete the threading of the coupling upon the faucet to a leak-proof position. In removing the coupling, it is only necessary to remove the sleeve 15 downwardly from the coupling and then by gripping the hose below the coupling and giving it a downward pull with a slight biasing action, the flexible fingers will readily detach from the threads of the faucet and disconnect the coupling therefrom.

While I have shown and described but a single embodiment of the invention, it will be understood that various modifications may be resorted to without departing from the spirit of the invention.

What I claim is:

1. A quick detachable hose coupling comprising
   (a) a body member permanently secured to the end of the hose and having an outwardly extending radial flange at its end;
   (b) a molded member of pliable plastic material having a circular base surrounding said body and adapted to bear against the inner surface of said flange;
   (c) a plurality of fingers integral with said base providing internally threaded segments to adapt the same for engagement with a complementary male fitting, said fingers being outwardly flexible to permit the same to be forcibly telescoped on to or away from such male fitting;
   (d) a sleeve of rigid material adapted to be telescoped around said fingers to confine them against outward flexing; and,
   (e) co-operating means on said sleeve and fingers to prevent relative rotation while permitting relative sliding movement.

2. A quick detachable coupling as defined in claim 1 wherein the co-operating means on said sleeve and fingers consists of a series of interfitted longitudinal flutes and ribs on said sleeve and finger respectively.

3. A quick detachable coupling as defined in claim 1 wherein means is provided for frictionally retaining said sleeve upon said hose when said sleeve is removed from the coupling.

References Cited by the Examiner

UNITED STATES PATENTS

| | | | |
|---|---|---|---|
| 1,002,774 | 9/11 | Stauffer | 285—86 |
| 2,259,137 | 10/41 | Iftiger | 285—35 |
| 2,327,714 | 8/43 | Iftiger | 285—35 |
| 2,956,783 | 10/60 | Landstedt | 285—45 X |

FOREIGN PATENTS

| | | |
|---|---|---|
| 577,404 | 6/59 | Canada. |
| 28,505 | 1907 | Great Britain. |
| 737,732 | 9/55 | Great Britain. |

CARL W. TOMLIN, *Primary Examiner.*